US012800107B2

(12) United States Patent
Park et al.

(10) Patent No.: US 12,800,107 B2
(45) Date of Patent: Nov. 17, 2026

(54) INTEGRATED CONTROL SYSTEM, METHOD, AND DEVICE, FOR HYDROGEN FUELING BASED ON REAL-TIME CONTROL

(71) Applicants: Hyundai Motor Company, Seoul (KR); Kia Corporation, Seoul (KR); Industrial Academic Cooperation Foundation of Hoseo University, Ansan (KR)

(72) Inventors: Cheol Woo Park, Hwaseong (KR); Yong Ho Chung, Ansan (KR); Heon Chang Kim, Seongnam (KR)

(73) Assignees: Hyundai Motor Company, Seoul (KR); Kia Corporation, Seoul (KR); Industrial Academic Cooperation Foundation of Hoseo University, Asan (KR)

(*) Notice: Subject to any disclaimer, the term of this patent is extended or adjusted under 35 U.S.C. 154(b) by 0 days.

(21) Appl. No.: 18/706,933

(22) PCT Filed: Nov. 3, 2022

(86) PCT No.: PCT/KR2022/017177

§ 371 (c)(1),
(2) Date: May 2, 2024

(87) PCT Pub. No.: WO2023/080690

PCT Pub. Date: May 11, 2023

(65) Prior Publication Data

US 2024/0418322 A1 Dec. 19, 2024

(30) Foreign Application Priority Data

Nov. 3, 2021 (KR) ........................ 10-2021-0149960
Nov. 3, 2021 (KR) ........................ 10-2021-0149975

(51) Int. Cl.
*F17C 5/06* (2006.01)
*F17C 5/00* (2006.01)

(52) U.S. Cl.
CPC ................ *F17C 5/007* (2013.01); *F17C 5/06* (2013.01); *F17C 2221/012* (2013.01);
(Continued)

(58) Field of Classification Search
CPC ...... F17C 5/007; F17C 5/06; F17C 2221/012; F17C 2227/0337; F17C 2250/032;
(Continued)

(56) References Cited

U.S. PATENT DOCUMENTS 8,662,115 B2 * 3/2014 Mori ...................... B67D 7/348 141/2
9,109,750 B2 * 8/2015 Okawachi ............ F17C 13/026
(Continued)

FOREIGN PATENT DOCUMENTS

CN 211289563 U 8/2020
EP 3855062 A1 * 7/2021 ................ F17C 5/06
(Continued)

OTHER PUBLICATIONS

KR-20200104441-A English Translation of Specification (Year: 2025).*
(Continued)

*Primary Examiner* — David Colon-Morales
*Assistant Examiner* — Stephanie A Shrieves
(74) *Attorney, Agent, or Firm* — Fox Rothschild LLP

(57) ABSTRACT

A control method for hydrogen fueling for a hydrogen fueled mobility is an integrated control method that includes steps of: acquiring a measurement value of a current state; based on the measurement value of the current state, determining whether a second control command is needed for at least a hydrogen fueling station and/or the hydrogen fueled mobil-
(Continued)

ity, in addition to a first control command executed on a dispenser side; and, according to the result of the determining step, generating the second control command for the hydrogen fueling station and/or the hydrogen fueled mobility.

6 Claims, 11 Drawing Sheets

(52) U.S. Cl.
CPC *F17C 2227/0337* (2013.01); *F17C 2250/032* (2013.01); *F17C 2250/043* (2013.01); *F17C 2250/0439* (2013.01); *F17C 2250/0694* (2013.01); *F17C 2265/065* (2013.01); *F17C 2270/0139* (2013.01); *F17C 2270/0168* (2013.01); *F17C 2270/0184* (2013.01)

(58) Field of Classification Search
CPC ........ F17C 2250/043; F17C 2250/0439; F17C 2250/0694; F17C 2265/065; F17C 2270/0139; F17C 2270/0168; F17C 2270/0184; F17C 5/00; F17C 13/02; F17C 2260/025; G06N 3/08; Y02E 60/32; Y02E 60/34; G01N 3/08
USPC ............................................................ 141/11
See application file for complete search history.

(56) References Cited

U.S. PATENT DOCUMENTS

| | | | | |
|---|---|---|---|---|
| 11,293,595 | B2 | 4/2022 | Chae | |
| 12,085,233 | B2 * | 9/2024 | He | F17C 13/003 |
| 12,297,962 | B2 * | 5/2025 | Handa | F17C 5/007 |
| 2015/0153005 | A1 * | 6/2015 | Takano | F17C 5/007 141/227 |
| 2015/0184804 | A1 * | 7/2015 | Handa | F17C 5/06 141/1 |
| 2019/0086032 | A1 * | 3/2019 | Handa | F17C 5/06 |
| 2019/0184847 | A1 * | 6/2019 | Mathison | F17C 13/028 |
| 2020/0226616 | A1 | 7/2020 | McClung et al. | |
| 2021/0262618 | A1 * | 8/2021 | Handa | F17C 5/06 |
| 2021/0310616 | A1 * | 10/2021 | Chae | F17C 13/04 |
| 2021/0348722 | A1 | 11/2021 | He et al. | |
| 2023/0204159 | A1 | 6/2023 | Werlen et al. | |

FOREIGN PATENT DOCUMENTS

| | | | | |
|---|---|---|---|---|
| JP | 2007-138973 | A | 6/2007 | |
| JP | 2015-124830 | A | 7/2015 | |
| JP | 2016-169869 | A | 9/2016 | |
| JP | 2021-95982 | A | 6/2021 | |
| KR | 10-2020-0037299 | A | 4/2020 | |
| KR | 10-2020-0104441 | A | 9/2020 | |
| KR | 20200104441 | A * | 9/2020 | F17C 13/02 |
| KR | 10-2021-0061415 | A | 5/2021 | |
| KR | 10-2021-0090059 | A | 7/2021 | |
| KR | 20210090059 | A * | 7/2021 | F17C 5/007 |
| KR | 10-2021-0122622 | A | 10/2021 | |
| KR | 20210122622 | A * | 10/2021 | F17C 5/06 |
| WO | 2014/150320 | A1 | 9/2014 | |
| WO | 2019/235386 | A1 | 12/2019 | |

OTHER PUBLICATIONS

KR-20210090059-A English Translation of Specification (Year: 2025).*

KR-20210122622-A English Translation of Specification (Year: 2026).*

Y. Wang, et al., "Predicting fueling process on hydrogen refueling stations using multi-task machine learning", Elsevier, International Journal of Hydrogen Energy, 45 (2002) 32743-32752.

* cited by examiner

FIG. 10

S730

Moving Horizon Prediction:

$T_{ANN}(i+1)$ $P_{ANN}(i+1)$ $SOC(i+1)=f[T_{ANN}(i+1), P_{ANN}(i+1)]$ $T_{ANN}(i+2)$ $P_{ANN}(i+2)$ $SOC(i+2)=f[T_{ANN}(i+2), P_{ANN}(i+2)]$

.....

$T_{ANN}(i+n)$ $P_{ANN}(i+n)$ $SOC(i+n)=f[T_{ANN}(i+n), P_{ANN}(i+n)]$ with constraints $T_{ANN}(i+k) < Tmax$, $P_{ANN}(i+k) < Pmax$, for arbitrary i,k

FIG. 11

S740

Find prediction set to minimize Cost function:

$Min\{\Sigma_{k=1}^{n}(SOC_{sp} - SOC(i+k))^2 + \theta)$

FIG. 14

| No. | (100)-(300) Signaling | (100)-(200) Control | Event (at T40, for example) |
|---|---|---|---|
| 1 | X | X | ■ Fueling is proceeding smoothly with desirable parameter ranges (Default) |
| 2 | 0 | X | ■ Precooling temperature is -40°C,<br>■ ① Outside temperature is higher than preset value,<br>■ ② Increment of temperature of storage tank is large |
| 3 | X | 0 | ■ Precooling is excessive (i.e., overcooled) (→ Adjust target value) |
| 4 | 0 | 0 | ■ This is situation related to situation No. 2,<br>■ Cooling amount needs to be adjusted during fueling and precooling target temperature is adjusted up/down |

INTEGRATED CONTROL SYSTEM, METHOD, AND DEVICE, FOR HYDROGEN FUELING BASED ON REAL-TIME CONTROL

CROSS-REFERENCE TO RELATED APPLICATIONS

The present application is a U.S. National Phase application under 35 U.S.C. § 371 of International Application No. PCT/KR2022/017177 filed on Nov. 3, 2022, which claims under 35 U.S.C. § 119(a) the benefit of Korean Patent Application No. 10-2021-0149960 filed on Nov. 3, 2021 and Korean Patent Application No. 10-2021-0149975 filed on Nov. 3, 2021, the entire contents of which are incorporated by reference herein.

TECHNICAL FIELD

The present disclosure relates to a technology for controlling hydrogen fueling/supply for a hydrogen fueled mobility, more particularly, to a hydrogen fueling process for enhancing an efficiency of the hydrogen fueling/supply and improving a speed and a real-time operability of the fueling/supply. Additionally, the present disclosure relates to a control scheme for the process and a protocol for the control scheme.

BACKGROUND ART

A hydrogen vehicle, a hydrogen electric vehicle, or a fuel cell electric vehicle (FCEV) each refer to a vehicle driven by electrical energy generated by a reaction of high-pressure hydrogen stored in the vehicle and oxygen in the air, and produce little pollution.

The hydrogen electric vehicle generates electricity using the hydrogen as an energy source by use of a fuel cell system. As is known in the art, the hydrogen electric vehicle not only exhausts pure water ($H_2O$) vapor in the course of generating the electricity but also removes ultrafine dusts in the air while being driven, and thus are attracting attention as a future eco-friendly mobility. Since the fuel, i.e., hydrogen, is abundant on earth and the energy production process is eco-friendly, the hydrogen electric vehicle is spotlighted as a technology with the potential to be utilized across industries.

The hydrogen fueled mobility refers to a mobility that uses the hydrogen as an energy source or generates the electrical energy using the hydrogen as the fuel to drive an electric motor by the electrical energy.

In addition to the hydrogen electric vehicle described above, the hydrogen fueled mobility may include an aerial mobility as well as an industrial truck, a train, a ship, and an aircraft that generate the electrical energy using the hydrogen as the fuel and is driven by the electrical energy.

More generally, the application fields of the technical idea of the present disclosure may further include a building and a facility that uses the hydrogen as the energy source.

The hydrogen electric vehicle produces electrical energy by supplying the high-pressure hydrogen stored safely in a hydrogen fuel storage tank and the oxygen introduced through an air supply system to a fuel cell stack and causing an electrochemical reaction between the hydrogen and the oxygen to occur. The electrical energy produced in the fuel cell stack is converted into kinetic energy through a motor to drive the hydrogen electric vehicle, and an operating hydrogen electric vehicle discharges only the pure water vapor through an exhaust port.

The fuel cell system provides power to the vehicle similarly to an engine in an internal combustion engine vehicle. A fuel cell, which is also referred to as a "tertiary battery," is a unit generating the electrical energy needed to drive the hydrogen electric vehicle. The fuel cell converts the chemical energy into the electrical energy through electrochemical reactions between the hydrogen and the oxygen. The electrical energy produced by the reactions originates from pure chemical reactions and does not produce any exhaust gases such as carbon dioxide unlike fossil fuels. Fuel cells are often categorized by the type of the fuel or an electrolyte. Leading fuel cell technologies may include a proton exchange membrane fuel cell (PEMFC), a solid oxide fuel cell (SOFC), and a molten carbonate fuel cell (MCFC). The components producing the electrical power using the fuel cells in the hydrogen electric vehicle includes the fuel cell stack, a hydrogen supply system, and an air supply system, and a thermal management system.

An efficient generation of the electrical energy in the fuel cell stack requires an assistance of the operation mechanism. Among several apparatuses in the operation mechanism, the hydrogen supply system plays a role of changing a pressure condition of the hydrogen safely stored in the hydrogen fuel storage tank from a high pressure to a low pressure and transfer to the fuel cell stack. In addition, the hydrogen supply system may increase a hydrogen supply efficiency by recirculating through a recirculation line.

A thermal management system may release heat generated while the fuel cell stack undergoes an electrochemical reaction to the outside and circulate cooling water to maintain a temperature of the fuel cell stack within a certain range. Thermal management system may affect the output and lifespan of the fuel cell stack.

A hydrogen fueled car other than the hydrogen electric vehicle is also a vehicle that uses the hydrogen as the fuel. The hydrogen fueled car is driven by an electric motor which is rotated by heat generated by directly burning the hydrogen in the engine. The method of fueling/supplying the hydrogen for the hydrogen fueled car is not much different from the hydrogen fueling/supply method for the hydrogen electric vehicle.

The control scheme for fueling or supply hydrogen to the hydrogen fueled mobility aims to control the hydrogen fueling/supply such that a temperature (T) and pressure (P) of a compressed hydrogen storage system (CHSS) on the fuel cell side are maintained below a certain temperature limit and a pressure limit to ensure the safety.

The hydrogen fueling/supply process, the control scheme, and the protocol thereof in a conventional hydrogen electric vehicle had been stipulated before wired/wireless communications or computing techniques for the control became mature, and thus do not utilize the state-of-art information and communications technologies (ICT) to their full extent.

Therefore, the conventional hydrogen fueling/supply subsystem in the hydrogen electric vehicle is inefficient, slow, and is not suitable for large-scale hydrogen fueling.

DISCLOSURE OF INVENTION

Technical Problem

One object of the present disclosure to solve the above problems is to improve the efficiency of the hydrogen fueling/supply process while safely fueling/supplying the hydrogen fuel and to improve the speed and the real-time operability of the hydrogen fueling/supply process.

One object of the present disclosure is to reduce a time required for the fueling within an attainable range by performing a fueling operation at a highest and optimal fueling speed that satisfies a condition of being below a safety limit.

One object of the present disclosure is to actively control an amount of required precooling and an amount of actual precooling to optimize a cooling load of a hydrogen fueling station and increase an operation efficiency of the hydrogen charging station.

One object of the present disclosure is to provide a control scheme that may be applicable to a new device by updating a control logic simply through a certain learning or training process and thus may be applied widely to various mobility areas.

One object of the present disclosure is to provide a separate cooling system in a hydrogen storage tank in a vehicle so as to enable to increase the fueling speed and to allow to actively deal with an overheating of the hydrogen storage tank and improve the safety of hydrogen fuel mobility.

Technical Solution

According to an aspect of an exemplary embodiment, a hydrogen fueling control method for a hydrogen fueled mobility is a method of integratively controlling hydrogen fueling for the hydrogen fueled mobility and may include: acquiring a current state measurement value; determining, based on the current state measurement value, whether a second control command for at least one of a hydrogen fueling station and/or the hydrogen fueled mobility is needed in addition to a first control command executed on a dispenser side; and generating the second control command for at least one of the hydrogen fueling station and/or the hydrogen fueled mobility according to a determination result.

The second control command for the hydrogen fueling station may include a command for adjusting a target value of a precooling temperature of the hydrogen fueling station.

The second control command for the hydrogen fueled mobility may include a command for cooling a compressed hydrogen storage system (CHSS) of the hydrogen fueled mobility.

The hydrogen fueling control method may further include: determining whether the current state measurement value satisfies a constraint.

The constraint may include a condition that a temperature and a pressure of a compressed hydrogen storage system (CHSS) of the hydrogen fueled mobility do not exceed a temperature limit and a pressure limit, respectively.

The hydrogen fueling control method may further include: generating the first control command executed on the dispenser side based on the current state measurement value.

The first control command may include a control command for a pressure ramp rate (PRR) for the hydrogen fueling.

The operation of generating the first control command may include: generating the first control command based on a simulation result and an on-site actual data for the current state measurement value.

The operation of generating the first control command may include: generating the first control command by using a model predictive control technique based on the current state measurement value.

The operation of generating the first control command may include: generating the first control command based on an output of an artificial neural network receiving the current state measurement value as an input.

According to another aspect of an exemplary embodiment, a hydrogen fueling control apparatus for a hydrogen fueled mobility is a device for integratively controlling hydrogen fueling for the hydrogen fueled mobility and includes: a processor; and a memory configured to store at least one program instruction. The processor executes the at least one program instruction to: acquire a current state measurement value; determine, based on the current state measurement value, whether a second control command for at least one of a hydrogen fueling station and/or the hydrogen fueled mobility is needed in addition to a first control command executed on a dispenser side; and generate the second control command for at least one of the hydrogen fueling station and/or the hydrogen fueled mobility according to a determination result.

The processor may be configured to determine whether the current state measurement value satisfies a constraint.

The processor may be configured to generate the first control command executed on the dispenser side based on the current state measurement value.

The processor may be configured to generate the first control command based on a simulation result and an on-site actual data for the current state measurement value.

The processor may be configured to generate the first control command by using a model predictive control technique based on the current state measurement value.

The processor may be configured to generate the first control command based on an output of an artificial neural network receiving the current state measurement value as input.

Advantageous Effects

According to an exemplary embodiment of the present disclosure, the fueling speed is controlled in real-time with reference to a real-time temperature of the hydrogen storage tank so that the hydrogen fueling system may operate at a highest and optimal fueling speed that satisfies a condition of being below a safety limit, which allows to reduce the time required for the fueling within an attainable range.

According to an exemplary embodiment of the present disclosure, the amount of the required precooling and the amount of the actual precooling are actively controlled to optimize the cooling load of the hydrogen fueling station and increase the operation efficiency of the hydrogen charging station.

According to an exemplary embodiment of the present disclosure, the control scheme may be applicable to a new device by updating its control logic simply through a certain learning or training process and thus is widely applicable to various mobility areas.

According to an exemplary embodiment of the present disclosure, a separate cooling system is provided in the hydrogen storage tank in the vehicle so as to enable to increase the fueling speed and to allow to actively deal with an overheating of the hydrogen storage tank and improve the safety of hydrogen fuel mobility.

DESCRIPTION OF DRAWINGS

FIG. 10 is a conceptual diagram illustrating some portion of the process of FIG. 9 in more detail;

FIG. 11 is a conceptual diagram illustrating some portion of the process of FIG. 9 in more detail;

FIG. 14 is a table exemplifying an event-based control process for the integrated control model shown in FIG. 13;

BEST MODE

Figure 1:
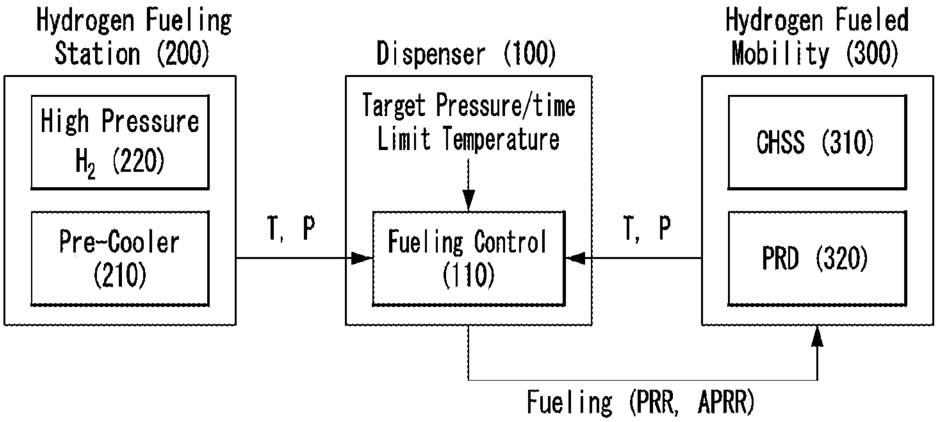
FIG. 1 is a conceptual diagram illustrating an example of a hydrogen fueling process for a hydrogen fueled mobility to which an embodiment of the present disclosure is applied.

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Terms used in the present disclosure are defined as follows.

"Hydrogen Fueled Vehicle", "Hydrogen Fueled Mobility: A non-polluting vehicle or mobility including 1) a vehicle or mobility driven by electrical energy generated by reactions of high-pressure hydrogen stored in the vehicle/mobility with atmospheric air such as "Hydrogen Electric Vehicle" or "Fuel Cell Electric Vehicle (FCEV)", and/or 2) a vehicle or mobility driven by a propulsion system fueled with hydrogen gas or fluid such as "Internal Combustion Engine (ICE)".

"Compressed Hydrogen Storage System (CHSS)": An apparatus which is a part of the fuel cell of a vehicle to compress and store the hydrogen.

"Pressure Relief Device (PRD)": A device disposed in the CHSS and capable of isolating stored hydrogen from the other part of the fueling system and environment and exhausting the hydrogen to the outside.

"Hydrogen fueling process": A process of supplying the high-pressure hydrogen from a hydrogen fueling station to the fuel cell and to accumulate the hydrogen in the fuel cell.

"Pressure Ramp Rate (PRR)": An increase rate of a pressure of CHSS and measured in mega-pascals per minute (MPa/min).

"Average Pressure Ramp Rate (APRR)": An average of the increase rate of the pressure from the beginning to the end of the hydrogen fueling.

"Precooling": A process of cooling the hydrogen in a hydrogen fueling station before the fueling.

"Dispenser": A component supplying precooled hydrogen to the CHSS.

"Nozzle": A device that is connected to a hydrogen dispensing system of the hydrogen fueling station and may be coupled to a receptacle of the hydrogen electric vehicle and to supply the hydrogen fuel to the hydrogen electric vehicle.

Meanwhile, one or more conventional components may be included in a configuration of the present disclosure if necessary, and such components will be described herein to an extent that it does not obscure the technical idea and concept of the present disclosure. If the description of the conventional components may obscure the technical idea and concept of the present disclosure, however, detailed description of such components may be omitted for simplicity. For example, the use of a thermodynamic model for the hydrogen fueling control, an application of a model predictive control for a generalized dynamic control, and a preparation and a control of an artificial neural network for the training and inference of the artificial neural network may be implemented using conventional technologies, and at least some of the conventional components may be employed as elements required to embody the present disclosure.

However, the present disclosure is not intended to claim the conventional component, and the conventional component may be included as an elements of the apparatus or method of the present disclosure without deviating from the concept or spirit of the present disclosure.

Exemplary embodiments of the present disclosure will now be described in detail with reference to the accompanying drawings.

FIG. 1 is a conceptual diagram illustrating an example of a hydrogen fueling process for the hydrogen fueled mobility to which an embodiment of the present disclosure is applied.

Referring to FIG. 1, precooled hydrogen gas is supplied from a hydrogen fueling station 200 to a hydrogen fueled mobility 300 through a dispenser 100. The hydrogen fueling process may be described by parameters including the pressure ramp rate (PRR) and/or the average pressure ramp rate (APRR).

Although FIG. 1 shows an embodiment related to the hydrogen fueled mobility, it is apparent to those skilled in the art that the idea and spirit of the present disclosure are not limited thereto and are applicable to various types of hydrogen fueled mobilities.

The hydrogen fueled mobility refers to a mobility that uses the hydrogen as an energy source or generates the electrical energy using the hydrogen as the fuel to drive an electric motor by the electrical energy.

The hydrogen fueled mobility may include the hydrogen electric vehicle as well as an aerial mobility, an industrial truck, a train, a ship, and an aircraft that generate the electrical energy using the hydrogen as the fuel and is driven by the electrical energy.

The hydrogen fueling mobility may also be applicable to a building or a facility that uses the hydrogen as the energy source in addition to the hydrogen fueled mobility.

Meanwhile, while FIG. 1 shows an embodiment where hydrogen gas is used, the idea and spirit of the present disclosure may also be applied to an application using liquefied hydrogen.

Hereinafter, exemplary embodiments of the present disclosure will be described in terms of the hydrogen fueled mobility and the hydrogen gas for convenience of description, but the scope of the present disclosure is not to be construed as being limited thereto based on the exemplary embodiments.

In general, a hydrogen storage system installed in the vehicles may be generally divided into a high-pressure hydrogen storage tank, a pressure control device, high-pressure piping, and an external frame. The high-pressure hydrogen storage tank has been developed and commercialized with a capacity ranging from tens to hundreds of liters, and in case of devices for vehicles, small and lightweight storage tanks connected in parallel are used to secure high capacity.

The high-pressure hydrogen storage tank is widely known as the compressed hydrogen storage system (CHSS) 310. The term "storage tank" used herein for convenience of description refers to the CHSS 310.

In a typical hydrogen storage system, hydrogen storage is controlled through an access port allowing the hydrogen gas to enter and exit the storage tank 310. In consideration of the characteristic that hydrogen injection and discharge should not occur at the same time, a valve, pressure reducing mechanism, and various sensors for measurement are attached to the access port and the hydrogen storage is controlled through such devices.

The dispenser 100 is in charge of an interface between the hydrogen fueling station 200 and the vehicle 300. A target pressure and injection speed, etc. may be controlled based on information on the storage tank 310 of the vehicle 300 and information on fuel supply of the hydrogen fueling station 200. A control logic currently being used follows the SAE J2601 (2020 May) standard.

Conventionally, the transmission of the information from the vehicle 300 to the dispenser 100 is achieved through a communication method or a non-communication method. Even in the case where the communication method is employed conventionally, temperature and pressure values of the storage tank 310 in the vehicle 300 are simply transmitted unidirectionally from the vehicle 300 to the dispenser 100, and the dispenser 100 uses the information only as a safety reference for an emergency stop at a temperature limit or a pressure limit rather than actively utilizing the information.

All fueling control logic for the safe and rapid fueling is fulfilled in the dispenser 100, and the storage tank 310 is not equipped with any active safety management scheme but has only a safety management device that automatically releases the hydrogen through a pressure relief device (PRD) 320.

The hydrogen fueling station 200 may include a high-pressure hydrogen storage unit 220 and a precooler 210 in order to respond to an increase in the temperature of the hydrogen gas during a hydrogen fueling which will be described below with reference to FIG. 3. The precooler 210 lowers the temperature of the hydrogen gas through a precooling, so that precooled hydrogen gas is supplied to the hydrogen electric vehicle 300 via the dispenser 100.

According to an exemplary embodiment of the present disclosure, general mechanical configurations of the devices for the hydrogen fueling may be similar to those of conventional devices, but the fueling control logic 110 in the dispenser 100 actively controls the hydrogen fueling process based on state information such as temperatures and the pressures received from the vehicle 300 and the hydrogen fueling station 200 and fueling status information such as a filling rate or state of charge (SOC) of the CHSS 310.

According to an exemplary embodiment of the present disclosure, the fueling speed is controlled in real time using real-time temperature data of the storage tank 310, so that the hydrogen fueling process can be operated at a highest fueling speed under a condition satisfying a safety limit and a fueling time can be reduced within an available range.

According to a conventional fueling protocol, boundary conditions for safety are set excessively strictly such that the precooling is excessive to the extent that the temperature of the storage tank 310 is measured to be around 40-50° C. at the time of completion of the fueling.

According to an exemplary embodiment of the present disclosure, precooling requirements and serving amounts are actively adjusted so as to optimize a cooling load of the hydrogen fueling station 200 and enhance an operating efficiency of the hydrogen fueling station 200.

The conventional protocol, which is set for a light duty hydrogen electric vehicle, has a problem that all variables must be reset and reflected in the standard in order to be applied to the fueling of a new mobility.

The fueling control logic according to an exemplary embodiment of the present disclosure is based on an artificial neural network and may be updated through a learning or training process when it is to be applied to a new device, and such a control scheme may be widely applicable to various kinds of mobilities.

The only way to prevent the overheating of the storage tank 310 of the hydrogen electric vehicle 300 in the conventional system may be to release the gas through the PRD 320 when the tank or the gas overheats above a certain temperature.

According to an exemplary embodiment of the present disclosure, a cooling system is provided in the storage tank 310 itself to enable to increase the fueling speed and actively respond to the overheating of the storage tank 310, and thus the safety of the hydrogen electric vehicle 300 may be improved.

An exemplary embodiment of the present disclosure allows to improve the efficiency of the hydrogen fueling/supply process while safely fueling/supplying the hydrogen fuel and enables to improve the speed and the real-time operability of the hydrogen fueling/supply process.

An exemplary embodiment of the present disclosure may provide a hydrogen fueling control scheme based on a model predictive control, which ensures the real-time operability.

An exemplary embodiment of the present disclosure may provide a control scheme based on an artificial neural network model with an improved accuracy of predicting a hydrogen fueling result. The accuracy of predicting the hydrogen fueling result can be improved by applying real-time measurement data to the artificial neural network model that uses the actual fueling data along with theoretical simulation results.

An exemplary embodiment of the present disclosure may improve the efficiency of the hydrogen fueling control by integrally managing the actual measurement data and state information predicted by the model by use of an intelligent meta system (IMS).

Figure 2:
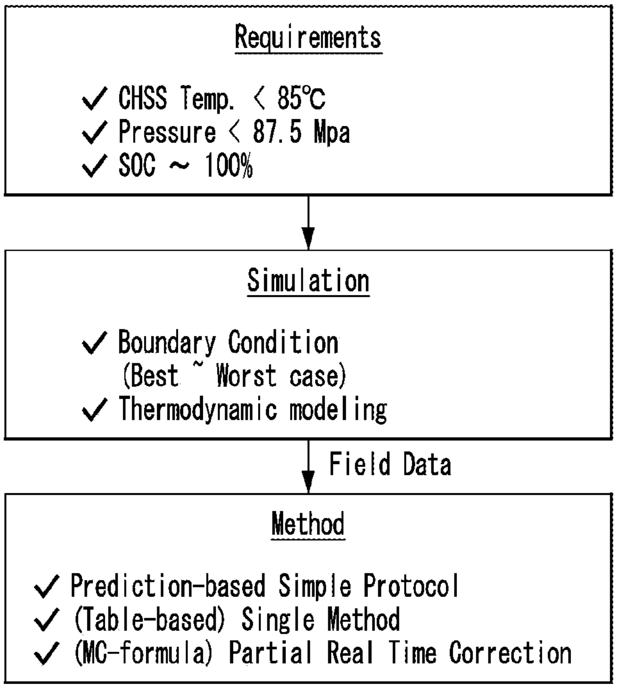
FIG. 2 is a conceptual diagram illustrating an example of a logical process for the hydrogen fueling for the hydrogen fueled mobility to which an embodiment of the present disclosure is applied.

FIG. 2 is a conceptual diagram illustrating an example of a logical process for the hydrogen fueling for the hydrogen fueled mobility to which an exemplary embodiment of the present disclosure is applied.

As mentioned above, according to the conventional hydrogen fueling process, the dispenser 100 is responsible for the control of data flows between the vehicle 300 and the hydrogen fueling station 200, and the dispenser 100 is equipped with a protocol for accomplishing the method of injecting the hydrogen into the vehicle 300 according to a certain protocol to control the data flow.

The protocol mounted on the dispenser 100 is based on the international standard SAE J2601 (2020 May), which applies similarly to the embodiments of the present disclosure to the extent that it meets the purpose of the present disclosure.

For certain minimum requirements for safety, simulations based on thermodynamic modeling for various situations are conducted, and a table-based static control or an MC formula-based partial real-time correction is performed using parameters derived from the simulations.

The minimum requirements for safety may include guidelines for upper limits of the temperature and the pressure of the CHSS 310 and the filling rate (SOC).

The simulation may be performed through thermodynamic modeling using boundary conditions including a best and a worst cases.

Such configurations may also be applied to the embodiments of the present disclosure to the extent that it meets the purpose of the present disclosure.

Even if the configurations of FIGS. 1 and 2 are employed, the following problems may arise in the conventional system where the state variables are not actively controlled in the dispenser 100. The problems may also be revealed in the systems relying on simulations using simple thermodynamic models.

Since the injection rate is determined in advance such that the boundary conditions may be satisfied in a worst case, an unnecessarily excessive precooling may occur and the overall fueling rate may be reduced. In such a case, the injection rate may be determined simply by the average pressure ramp rate (APRR), which may hinder an active response to a situation change. The unnecessarily excessive precooling may cause excessive energy consumptions and increase operating costs.

As described above, the conventional methods have limitations in the applications. That is, the dependency on the simulation-based results may result in a limitation to a capacity or shape of the storage tank 310 actually applicable to the vehicle. In case of a new system, separate resources may be required for the development and application of the system.

Since thermodynamic model takes a lot of time to derive calculation results of mathematical equations, it is common that variables derived through the model are utilized indirectly. Accordingly, the application of the model is limited in cases where there are no variables calculated in advance. Further, thermodynamic model reveals a lack of flexibility, e.g., a detailed adjustment of the model itself is difficult.

The conventional table-based method does not utilize the temperature of the precooled hydrogen provided from the hydrogen fueling station 200 or the temperature of the storage tank 310 measured in the vehicle 300, and thus reveals a very low efficiency and a difficulty in flexibly dealing with any changes in surrounding conditions.

Though the conventional MC formula-based method corrects the precooling temperature in real-time, the calculation and application of the method are complex and there may have limitations in the applications, which makes the expansion of the application difficult.

Therefore, there is no alternative of which protocol was developed with a main goal of completing the safe fueling and which may actively control unexpected situations such as the excessive precooling or the overheating of the storage tank 310. These problems bring about the increased operating costs due to the excessive cooling and delays in the fueling due to the overheating.

To solve the problems above, the present disclosure is characterized by reducing a dependency on the simulation and actively controlling the state variables by reflecting real-time measurement data.

Figure 3:
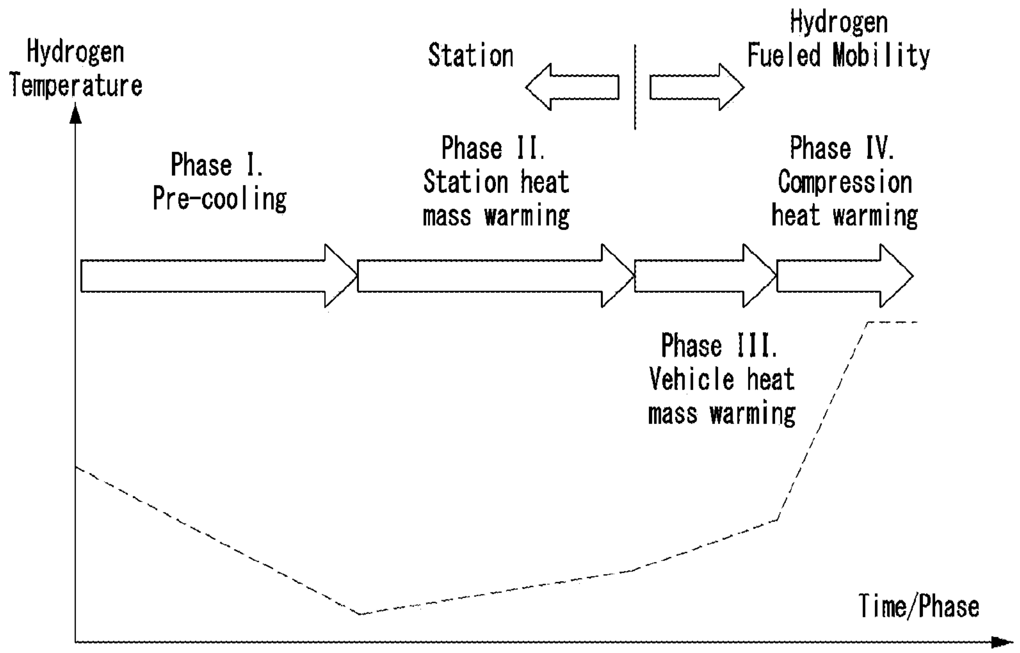
FIG. 3 is a conceptual diagram illustrating an example of a state change that occurs in the hydrogen fueling process for the hydrogen fueled mobility to which an embodiment of the present disclosure is applied.

FIG. 3 is a conceptual diagram illustrating an example of a state change that occurs in the hydrogen fueling process for the hydrogen fueled mobility to which an embodiment of the present disclosure is applied.

Referring to FIG. 3, when hydrogen is injected into the storage tank 310, an internal temperature of the gaseous hydrogen inside the storage tank 310 increases due to compression heat.

The temperature control of the hydrogen fueling process is performed such that the internal temperature of the storage tank 310 is controlled to be below 85° C. at the time of completion of the final filling of the precooled hydrogen.

Domes and bodies of the storage tank 310 are enclosed by carbon fibers of which heat transfer efficiency is low so as to block heat exchanges between external atmosphere and the gaseous hydrogen stored in the storage tank 310 during the driving of the vehicle.

While the temperature of the gaseous hydrogen inside the storage tank 310 rises during the fueling process, the temperature increase on a surface of the storage tank 310 is small compared with the internal temperature increase until the fueling is completed owing to the low heat transfer characteristics of the storage tank 310.

Such characteristics block heat exchange with the outside air which can alleviate the rapid temperature rise inside the storage tank 310 during the filling, a separate temperature management scheme is required.

However, the conventional system does not include any cooling means other than receiving precooled hydrogen gas from the hydrogen fueling station 200.

The hydrogen filling time may be managed by controlling the precooling and hydrogen injection rate at the hydrogen fueling station 200 such that the temperature of the hydrogen storage tank 310 is maintained below an upper limit, e.g., 85° C. However, there are no additional separate measures to manage the temperature of the hydrogen storage tank 310 of the vehicle 300.

As a result, it is difficult to control the temperature of the hydrogen storage tank 310 from the hydrogen fueling station 200, especially in summer when the outside temperature is high, which may cause problems such as a delayed fueling.

According to an exemplary embodiment of the present disclosure, the fueling process is established based on a base model represented by a characteristic curve of FIG. 3 and optimal control conditions suitable for actual environments are derived. In particular, the control of the operating load of the hydrogen fueling station 200 in the precooling stage in phase I and the filling rates, i.e. the pressure ramp rates (PRRs) during the fueling process of Phase II to Phase IV are optimized in consideration of real-time data of variables such as an outside temperature, an atmospheric pressure, and weather conditions that may be measured in the actual surrounding environment unlike the conventional methods.

Figure 4:
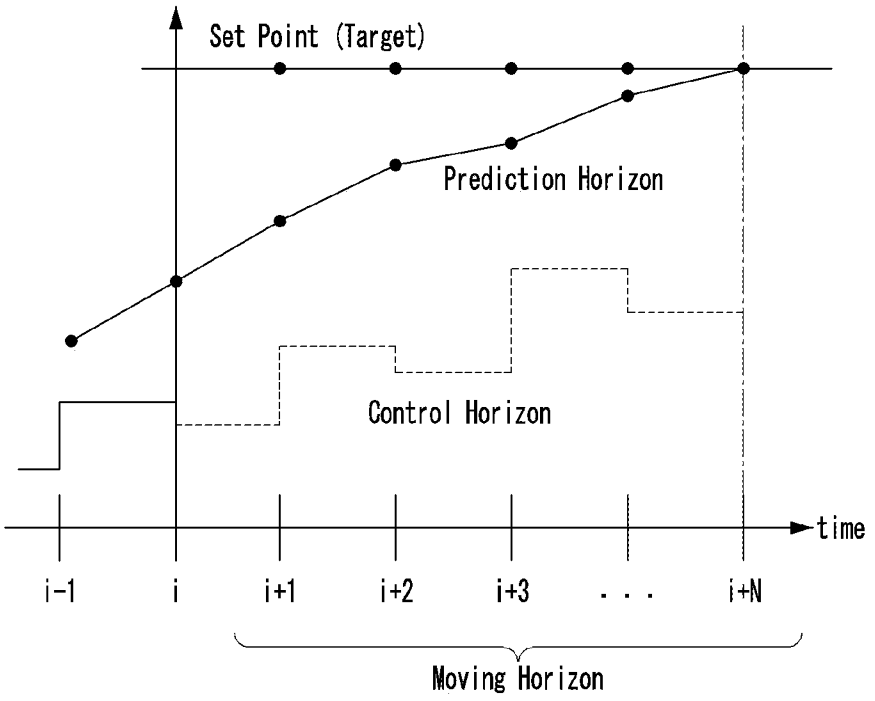
FIG. 4 is a conceptual diagram illustrating a concept of a model predictive control of the hydrogen fueling process for the hydrogen fueled mobility according to an exemplary embodiment of the present disclosure.

FIG. 4 is a conceptual diagram illustrating a concept of the model predictive control of the hydrogen fueling process for the hydrogen fueled mobility according to an exemplary embodiment of the present disclosure.

In an exemplary embodiment, a future fueling result is predicted from the hydrogen fueling model and current measured data in a state that the accuracy of the hydrogen fueling model reached a certain level, and the pressure ramp rate (PRR) may be controlled in real-time based on a prediction value and a measurement value such that an optimal fueling target may be reached while certain variables such as the temperature $T_{gas}$ or the pressure $P_{gas}$ of the gaseous hydrogen in the gaseous hydrogen of CHSS 310 does not violate the constraints.

That is, the model predictive control scheme according to an exemplary embodiment of the present disclosure may calculate a future output value based on the prediction value of the model and the current measurement value and adjust the operation parameter or variable such that the predicted future response moves to set points or target in an optimal manner.

Referring to FIG. 4, N model-based prediction values may be derived at a current time (i). The N model-based prediction values may form a prediction horizon.

Meanwhile, N control commands or control actions required to make N model predictions may form a control horizon. Each model-based prediction value in the prediction horizon may correspond to a respective value in the control horizon.

Actually, an (i+1)-th control action which is the first control action among the N control actions derived at the current time (i) may be delivered to the system. After one time interval, new N model prediction values and new N control actions are derived at the time (i+1), and the new model prediction values and the new control actions form a new prediction horizon and a new control horizon, respectively.

The technique of controlling the system while expanding or moving the horizon in such a manner is referred to as the model predictive control. According to an exemplary embodiment of the present disclosure, the model predictive control is conducted by using the measurement values of state information or the state values including the temperature and the pressure of gaseous hydrogen in the CHSS 310 and the prediction values of the state variables.

Figure 5:
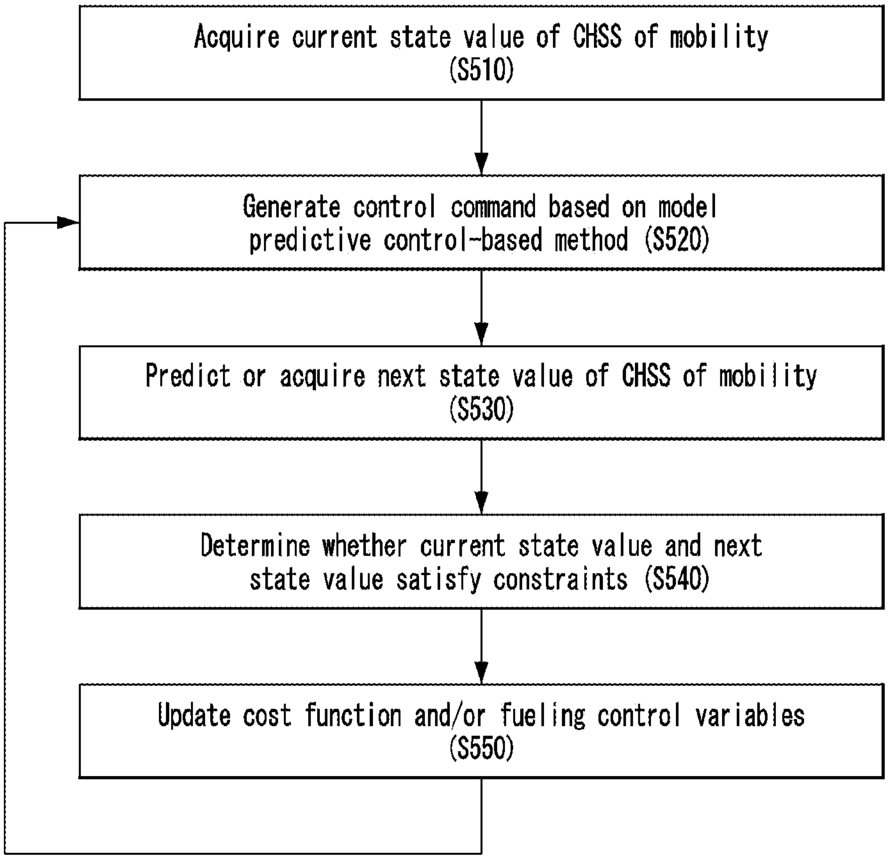
FIG. 5 is a flowchart illustrating a hydrogen fueling control method based on model prediction control according to an exemplary embodiment of the present disclosure.

FIG. 5 is a flowchart illustrating a hydrogen fueling control method based on model predictive control according to an exemplary embodiment of the present disclosure.

The hydrogen fueling method for the hydrogen fueled mobility according to the present embodiment is a model predictive control-based method and may include operations of acquiring a current state measurement value (S510); predicting or acquiring a next state value using an artificial neural network model (i.e. artificial neural network-model predictive control technique) based on the current state measurement value (S530); and generating a control command for the hydrogen fueling based on a comparison result between the current state measurement value and the next state value (S520).

The current state measurement values may include the measurement values of the temperature and the pressure of the gaseous hydrogen inside the CHSS 310.

The hydrogen fueling method according to an exemplary embodiment of the present disclosure may further include an operation of determining whether the current state measurement value and the next state value satisfy the constraints (S540).

The constraints may include a condition that the temperature and the pressure of the CHSS of the hydrogen fueled mobility do not exceed a temperature limit and a pressure limit, respectively.

The operation of generating the control command (S520) may include generating a control command for the pressure ramp rate (PRR) for the hydrogen fueling.

The operation of predicting or acquiring the next state value (S530) may include predicting a plurality of next state values forming the prediction horizon by use of a model.

In the operation of generating the control command (S520), a plurality of control commands forming the control horizon corresponding to the prediction horizon may be generated so that a process that the future response reaches the set points is optimized based on comparison results between the plurality of next state values and respective set points.

In the operation of predicting or acquiring the next state value (S530) and the operation of generating the control command (S520), a plurality of control commands forming the control horizon corresponding to the prediction horizon including a plurality of next state values may be acquired so that a process that the future response predicted by the artificial neural network model based on the model predictive control technique reaches the set points is optimized.

The hydrogen fueling method according to an exemplary embodiment may further include an operation of updating a cost function and/or the fueling control variables or parameters based on the current state measurement value and next state value (S550).

Figure 6:
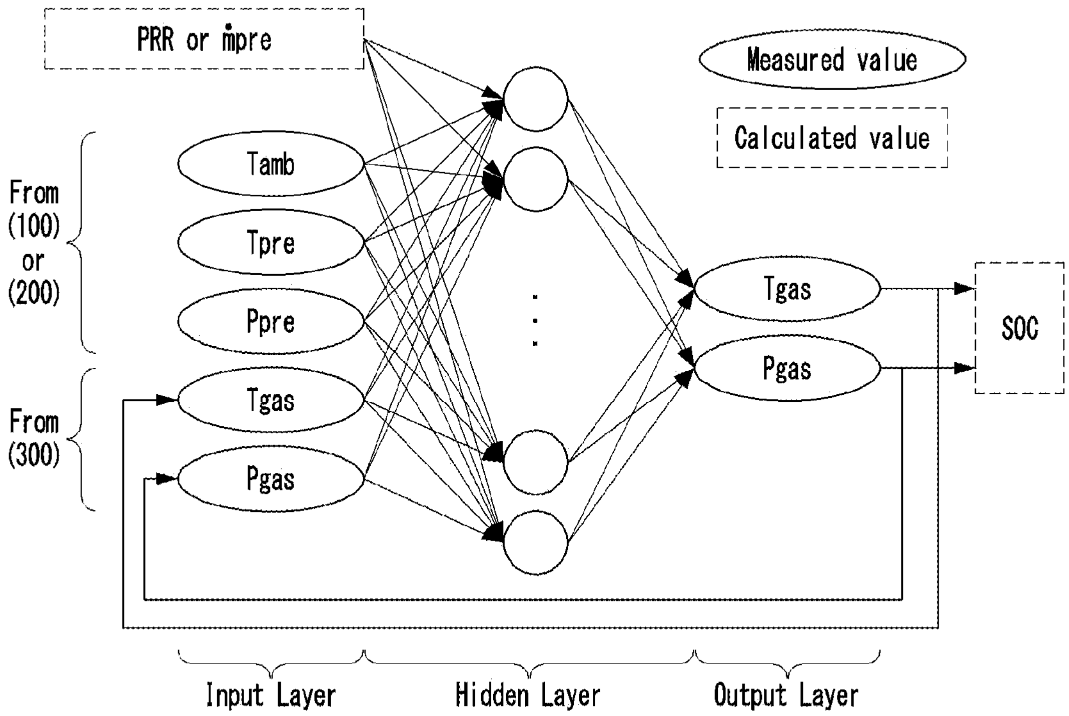
FIG. 6 is a conceptual diagram illustrating a concept of an artificial neural network for controlling the hydrogen fueling process for the hydrogen fueled mobility according to an exemplary embodiment of the present disclosure.

FIG. 6 is a conceptual diagram illustrating a concept of the artificial neural network for controlling the hydrogen fueling process for the hydrogen fueled mobility according to an exemplary embodiment of the present disclosure.

As shown in FIG. 6, the current state measurement values are input to an input layer.

Among the current state measurement values, an ambient temperature $T_{amb}$, a precooled gas temperature $T_{pre}$, and a precooled gas pressure $T_{pre}$ may be measured at a nozzle of the dispenser 100 or the hydrogen fueling station 200.

A gaseous hydrogen temperature $T_{gas}$ and a gaseous hydrogen pressure $P_{gas}$ may be measured at the CHSS 310 side of the hydrogen electric vehicle 300, and the actual measurement values may be input to the input layer.

During a training process of the artificial neural network, the current state measurement values may be provided to the input layer and the next state measurement values may be provided from an output layer so that both kinds of data may be used in the training of the artificial neural network. The training process of the artificial neural network may refer to a process of training a function of predicting a next state measurement value of the output layer based on a combination of the input measurement values. A correlation between the data input to the input layer and data given to the output layer is trained, which enables the predictions using theoretical results and real dynamic fueling data.

During an inference or output process using the artificial neural network, actually measured on-site measurement values may be provided to the input layer and a prediction value for the next measurement value may be obtained as an output inferred by an operation of the artificial neural network.

Shallow learning or deep learning may be used for the training process of the artificial neural network according to exemplary embodiments of the present disclosure, and the artificial neural network may be any type of network as long as it can meet the purpose of the present disclosure.

The values input to the input layer may be passed to the output layer through weight-based calculations in a hidden layer.

The state value output by the output layer, i.e. the prediction value for the next state, may be used to calculate a fueling state variable, e.g., a filling rate or SOC, using at least a part of thermodynamic model.

An exemplary embodiment of the present disclosure allows a hybrid control combining a theoretical simulation model and an artificial neural network. The hybrid control may fulfill certain results even through a training using a small amount of data and may achieve a desired performance that meets the purpose of the present disclosure by use of a lightweight artificial neural network.

A real-time pressure ramp rate (PRR) or a mass flow rate of compressed hydrogen (M) measured in a unit of kilograms per second (kg/s) derived from a feedback control process may affect the weights or parameters of the hidden layer of the artificial neural network.

The artificial neural network-based hydrogen fueling technique of the present disclosure may improve an accuracy of predicting fueling results through the model. Since the actual fueling data may be used along with theoretical simulation results, the real-time measurement data may be reflected in the prediction, which may further improve the accuracy of the prediction results.

While the conventional control protocol calculates and predicts the results through a simulation customized to an individual situation, the exemplary embodiment of the present disclosure may improve the accuracy through repeated training for various situations.

Because of the difference, the accuracy according an exemplary embodiment of the present disclosure gradually improves through updates as various theoretical values and empirical results are added. Furthermore, even when a new fueling process which employs a new storage tank 310 with a different configuration or of which flow rate is changed is introduced, the model may be updated and adapted to the new fueling process through the training using additional training data. Thus, the control method may be widely applicable to various mobilities.

Figure 7:
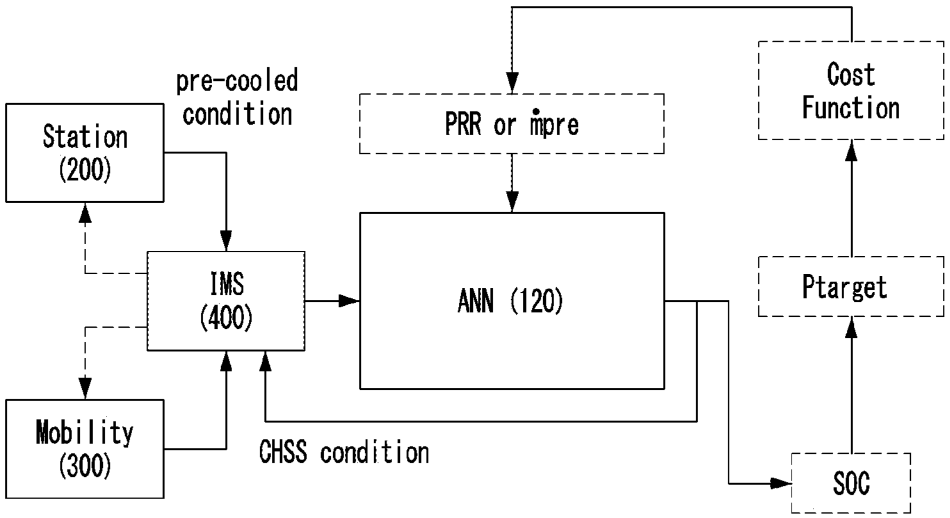
FIG. 7 is a conceptual diagram illustrating a hydrogen fueling control process for the hydrogen fueled mobility using the artificial neural network and an intelligent meta system (IMS) according to an exemplary embodiment of the present disclosure.

FIG. 7 is a conceptual diagram illustrating a hydrogen fueling control process for the hydrogen fueled mobility using the artificial neural network and an intelligent meta system (IMS) according to an exemplary embodiment of the present disclosure.

The IMS 400 enables the artificial neural network and/or the model predictive control exchange necessary information such as the gas temperature and the gas pressure measured in the CHSS 310 and/or predicted by the model. In addition, the IMS 400 enables an efficient filling rate control through an integrated management of distributed roles such as an adjustment of a precooling temperature according to real-time environmental changes.

The hydrogen fueling station 200 may transmit the measurement value or condition of the precooled gas to the IMS 400.

The hydrogen electric vehicle 300 may transmit the measurement value or condition of the CHSS 310 to the IMS 400.

In some embodiments of the present disclosure, the IMS 400 may be placed on the dispenser 100 side or may be implemented as an independent control device. The IMS 400 may provide control commands for the fueling control to the hydrogen fueling station 200 and the hydrogen electric vehicle 300. Such configurations will be described below with reference to FIGS. 13-16.

The IMS 400 may communicate with the artificial neural network 120 and may set control variables for controlling the artificial neural network 120, if necessary, to produce optimal fueling results.

A next target pressure $P_{target}$ may be derived from the SOC predicted from the artificial neural network 120, and a control parameter such as the pressure ramp rate (PRR) or the mass flow rate (M) for the next target pressure $P_{target}$ may be set.

At this time, the control parameter may be adjusted using a cost function, so that the state value satisfies the constraints in all situations.

The target pressure $P_{target}$ may be derived to achieve a next control target, for example, for a case where the SOC is 95% at 15° C. and under a normal working pressure (NWP) condition.

The constraints assumed in the cost function may include, for example, $T_{gas}$<85° C., $P_{gas}$<87.5 MPa, and SOC<100%.

The intelligent meta system 400 may be dependent upon the dispenser 100 or may be disposed to be independent from the dispenser 100.

The intelligent meta system 400 may be concentrated in a device or may be distributed across a plurality of hardware including the dispenser 100 and/or the hydrogen fueling station 200.

The intelligent meta system 400 may be implemented in the form of a cloud server.

Although the artificial neural network 120 is dependent on the dispenser 100 according to an exemplary embodiment shown in the drawing, the artificial neural network 120 may be implemented in a location independent from the dispenser 100 according to another exemplary embodiment of the present disclosure. For example, the artificial neural network 120 may be implemented in and trained in a cloud system and may be used to control the hydrogen fueling through the dispenser 100 by wired or wireless communications.

Alternatively, a separate artificial neural network may be implemented in and trained in the cloud system, and all or some of the parameters derived from the trained artificial neural network may be transferred to the local artificial neural network 120 disposed in the dispenser 100 to be used for the hydrogen fueling control. At this time, the parameters may be shared between the artificial neural network residing in the cloud system and the local artificial neural network 120 by a transfer learning or federated learning.

Figure 8:
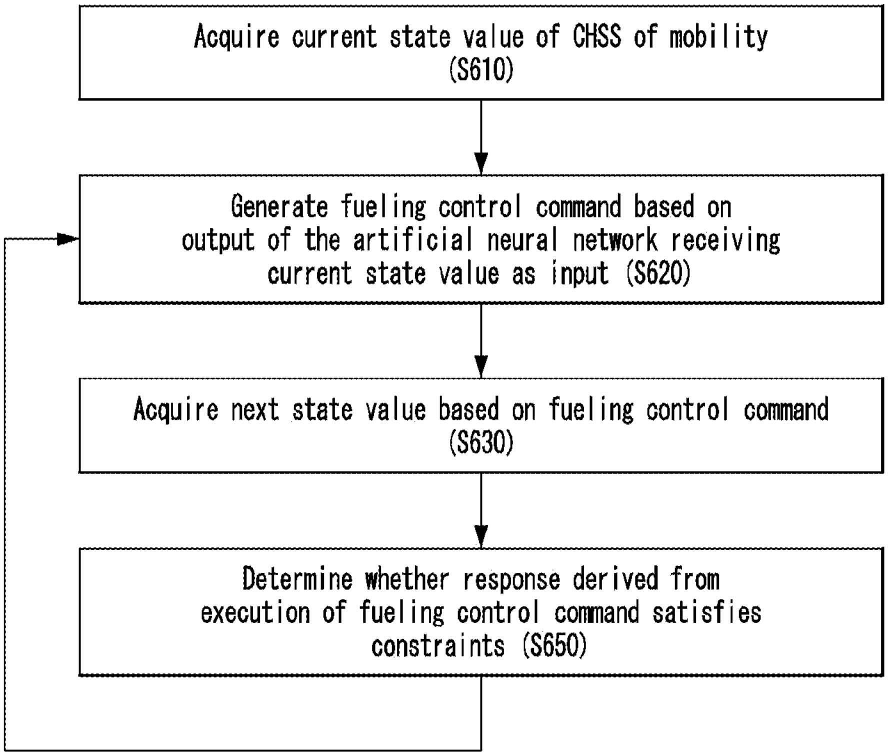
FIG. 8 is a flowchart illustrating an artificial neural network-based hydrogen fueling control method according to an exemplary embodiment of the present disclosure.

FIG. 8 is a flowchart illustrating an artificial neural network-based hydrogen fueling control method according to an exemplary embodiment of the present disclosure.

The hydrogen fueling method for the hydrogen fueled mobility according to the present embodiment is an artificial neural network-based method and may include operations of acquiring a current state measurement value (S610); generating a fueling control command for the hydrogen fueling based on an output of the artificial neural network receiving the current state measurement value as an input (S620); acquiring the next state value based on the fueling control command (S630); and determining whether a response derived from the execution of the fueling control command satisfies the constraints (S650).

In the operation of generating the fueling control command (S620), the fueling control command may be generated based on the output of the artificial neural network having learned a function of generating the fueling control command which enables each future response after the current state measurement value to reach the set point while satisfying the constraints.

In the operation of generating the fueling control command (S620), a plurality of control commands corresponding to a plurality of next state values may be generated based on the output of the artificial neural network having learned a function of predicting the plurality of next state values minimizing the cost function for the fueling state.

Figure 9:
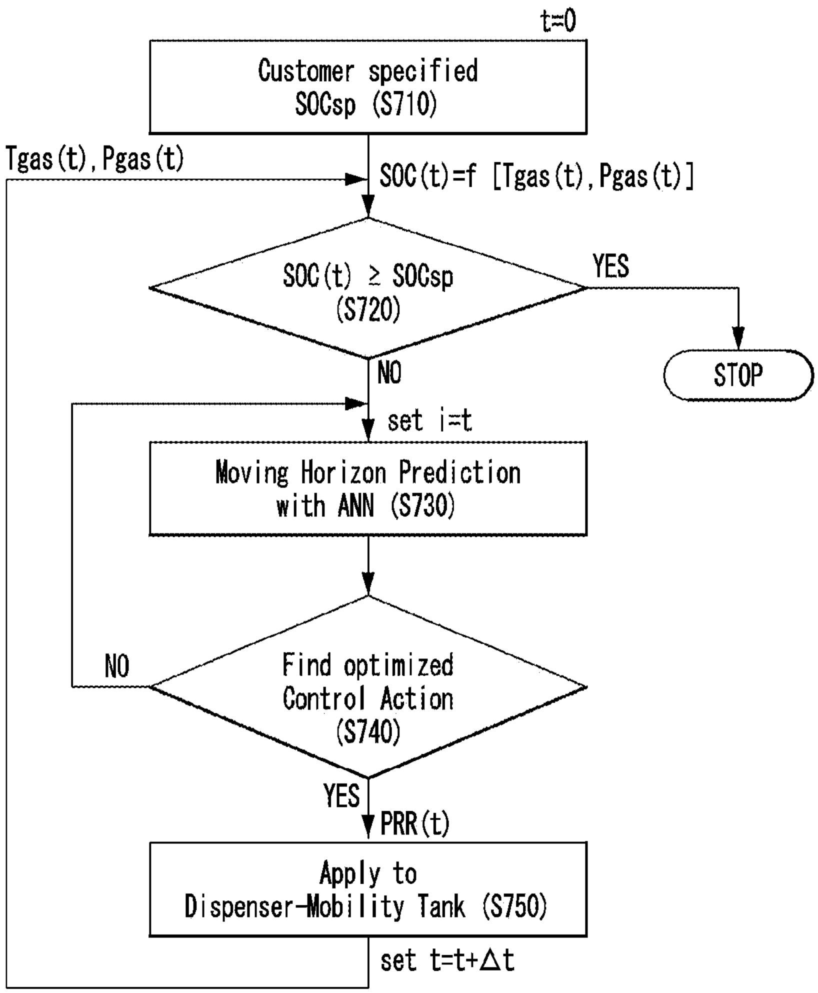
FIG. 9 is a flowchart illustrating a training process of the artificial neural network for the hydrogen fueling control based on the artificial neural network and the model predictive control according to an exemplary embodiment of the present disclosure.

FIG. 9 is a flowchart illustrating a training process of the artificial neural network for the hydrogen fueling control based on the artificial neural network and the model predictive control according to an exemplary embodiment of the present disclosure.

In the exemplary embodiment shown in FIG. 9, it is assumed that N future predictions are used along with the control commands respectively corresponding thereto. The N future predictions are assumed to be acquired from the neural network model 120 having learned a function of acquiring the prediction horizon and the control horizon based on the artificial neural network and the model predictive control, in particular, so that the process that the future response reaches the set points is optimized by the model predictive control technique.

In an exemplary embodiment of the present disclosure, a control system may be configured based on the artificial neural network model 120, and a real-time control system based on the model predictive control may be configured while ensuring the accuracy of the artificial neural network model 120.

The real-time control system enables to control the fueling speed, the pressure ramp rate, and/or the pressure increase rate, to remain within an optimal range, by predicting the future filling results and comparing the future filling results with the actual measurement values. The constraints, a control time interval, and sensitivities may be separately set within the system logic.

Initially, the optimal control is achieved based on the real-time data from the hydrogen fueling station 200 and vehicle 300. However, when a certain event occurs during the operation of the system, the system may directly control the precooling temperature of the precooler 210 and a cooling system of the vehicle 300 to enhance the overall efficiency of the hydrogen fueling process.

Referring to FIG. 9, the control process begins by receiving a SOC specified by a customer $SOC_{sp}$ at time t=0 (S710). For example, the current SOC may be 50% and the SOC specified by a customer ($SOC_{sp}$) may be 85%.

In case that the customer does not set the specific SOC ($SOC_{sp}$), the specific SOC ($SOC_{sp}$) may be set to a preset default value. For example, the default value may be 100%.

A current instantaneous SOC (SOC(t)) may be given as a function of the gaseous hydrogen temperature $T_{gas}(t)$ and the gaseous hydrogen pressure $P_{gas}(t)$, and a detailed representation of the function may be determined based on the general thermodynamic or dynamic model.

If the current SOC (SOC(t)) is greater than or equal to the specific SOC ($SOC_{sp}$) (S720), it may be determined that the hydrogen fueling has been completed since a fueling termination condition set by the customer is met. Thus, the hydrogen fueling procedure may be terminated. If the current SOC (SOC(t)) is smaller than the specific SOC ($SOC_{sp}$) (S720), an index (i) is set to i=t, and a moving horizon prediction involving the artificial neural network may be performed (S730).

The operation S730 may be performed by carrying out the model predictive control-based prediction depicted in FIG. 4 using the artificial neural network 120 or the like. In operation S740, it may be determined whether the N predictions acquired in the operation S730 are predictions or control commands optimized or meeting an intended purpose or not.

If it is determined in the operation S740 that the N predictions are optimal predictions, a control command PRR (t) may be determined based on the N predictions and the control commands, and a control command PRR (t) may be applied to the dispenser 100 and the storage tank 310 (S750).

Afterwards, time index (t) is increased, and new measurement values for the gaseous hydrogen temperature $T_{gas}(t)$ and the gaseous hydrogen pressure $P_{gas}(t)$ are acquired and transferred to the input of the operation S720.

If it is determined in the operation S740 that the N predictions acquired in the operation S730 are not optimal predictions, the operation S730 may be performed again to obtain new N predictions and control commands.

FIG. 10 is a conceptual diagram illustrating some portion of the process of FIG. 9 in more detail.

Referring to FIG. 10, pairs of state prediction values (T, P) satisfying the temperature limit and the pressure limit may be generated for arbitrary positive integers, i and k, in the operation S730 shown in FIG. 9. Here, 'i' is an index denoting the current time, and 'k' is an index corresponding to each prediction or control command forming the moving horizon.

At the current time (i=t), N state prediction values and corresponding control commands may be derived.

FIG. 11 is a conceptual diagram illustrating some portion of the process of FIG. 9 in more detail.

Referring to FIG. 11, the operation S740 shown in FIG. 9 may be understood as a process of searching for a set of N predictions that minimize the cost function indicating whether the final control target, $SOC_{sp}$, has been reached and a control sensitivity θ. The control sensitivity θ may include the PRR or a rate of change of M.

Figure 12:
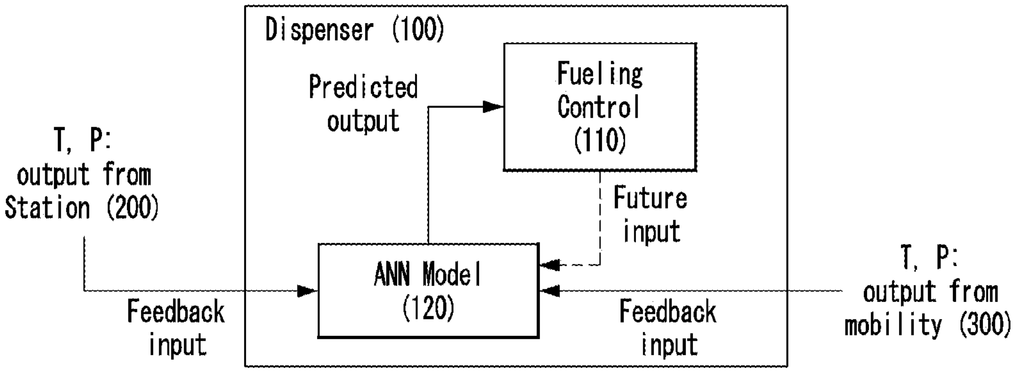
FIG. 12 is a conceptual diagram illustrating the hydrogen fueling control process based on the artificial neural network and the model predictive control according to an exemplary embodiment of the present disclosure.

FIG. 12 is a conceptual diagram illustrating the hydrogen fueling control process based on the artificial neural network and the model predictive control according to an exemplary embodiment of the present disclosure.

Referring to FIG. 12, the dispenser 100 may include a hydrogen fueling control logic 110 and the artificial neural network model 120.

The state measurement values output by the hydrogen electric vehicle 300 and including the temperature and pressure of the CHSS 310 may be provided to the artificial neural network model 120 as feedback input.

The state measurement values output by the hydrogen fueling station 200 and including the temperature and pressure of precooled gaseous hydrogen may be provided to the artificial neural network model 120 as another feedback.

Referring to FIGS. 9-11 together with FIG. 12, the artificial neural network model 120 may provide a predicted output to the hydrogen fueling control logic 110, and the hydrogen fueling control logic 110 may provide a future input to the artificial neural network model 120.

The control process based on the artificial neural network and the model predictive control, which utilizes the simulation together with the actual measurement data, performs at least partially the simulation using the artificial neural network model 120 and uses the prediction result in the control process.

Figure 13:
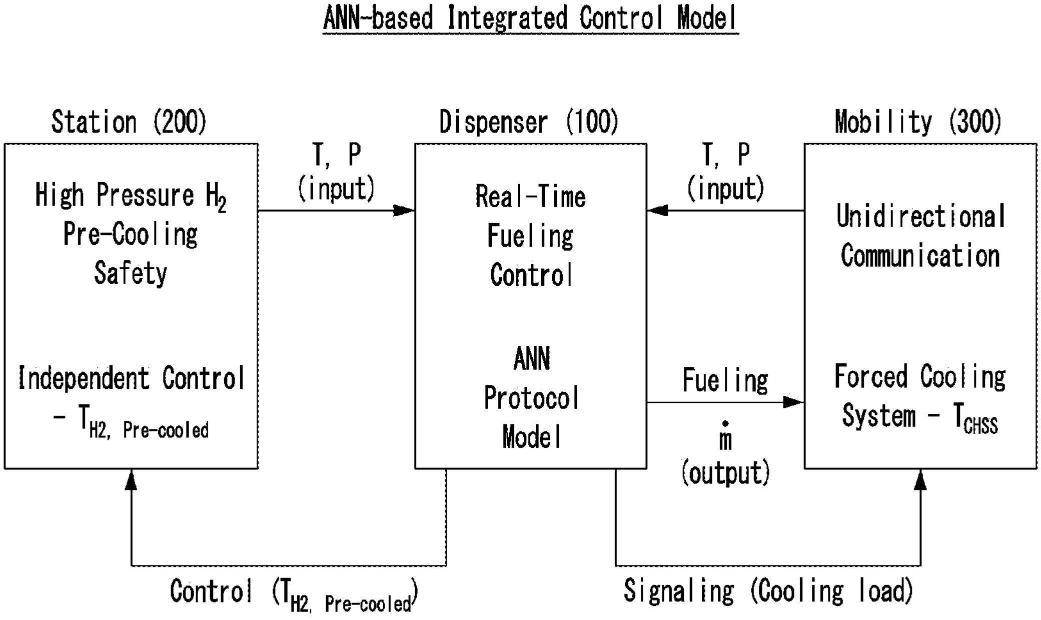
FIG. 13 is a conceptual diagram illustrating an artificial neural network-based integrated control model for controlling the hydrogen fueling process according to an exemplary embodiment of the present disclosure.

FIG. 13 is a conceptual diagram illustrating an artificial neural network-based integrated control model for controlling the hydrogen fueling process according to an exemplary embodiment of the present disclosure.

The present embodiment aims to configure an integrated control protocol for the hydrogen fueling based on real-time data, and the system may be implemented by utilizing various technical elements.

The protocol mounted on the dispenser 100 may receive the data of the precooled gaseous hydrogen from the hydrogen fueling station 200 and the data of the storage tank 310 from the vehicle 300 as real-time input values, and may generate output data by the mounted model to control the filling speed, the pressure ramp rate (PRR), and/or the mass flow rate (M).

When an event such as an external environmental change occurs, the integrated fueling control model in the dispenser 100 may directly control the precooling temperature of the hydrogen fueling station 200 and the cooling system of the vehicle 300 to generally adjust the filling speed, the pressure ramp rate (PRR), and/or the mass flow rate (M), and a process efficiency.

A precooling system or precooler 210 of the hydrogen fueling station 200 may include an independent cooling stabilization system separately to complement the control protocol.

In terms of temperature stabilization, the cooling stabilization system of the precooler 210 may be independently controlled, but a control target value thereof may be changed integrally by the protocol of the dispenser 100.

Additional functions related to the temperature stabilization may be given to the precooler 210 to improve the economic efficiency of the hydrogen fueling station 200 and complement the functions of the integrated control protocol.

The precooling temperature varies according to the initial temperature and flow rate of the gaseous hydrogen supplied to the precooler 210. To compensate for the variation, a new precooler structure to stabilize the temperature is proposed in an exemplary embodiment of the present disclosure.

The precooler 210 according to an exemplary embodiment of the present disclosure may include a control logic for a control of its own temperature and an interface with the protocol.

The storage tank 310 of the vehicle 300 may include a forced cooling system, which may partially cool the compression heat generated during the hydrogen fueling and thus improve the filling speed. The fueling protocol may also be involved in the operation and control of the forced cooling system of the storage tank 310.

In an exemplary embodiment of the present disclosure, a temperature management function may be provided to the storage tank 310 of the vehicle 300 to improve the hydrogen filling speed and to complement the function of the integrated control protocol.

In an exemplary embodiment of the present disclosure, the storage tank 310 may include a self-cooling system to increase the overall filling speed and enhance the safety of the vehicle 300. The storage tank 310 may include a control logic for the operation thereof and an interface with the protocol.

The integrated control according to an exemplary embodiment of the present disclosure may improve the current fueling efficiency and facilitate the preparation for the next fueling procedure.

FIG. 14 is a table exemplifying an event-based control process for the integrated control model shown in FIG. 13.

Referring to FIG. 14, in case that the hydrogen fueling is proceeding smoothly while revealing desirable parameter ranges by a normal operation, the fueling target may be achieved only with the control based on the dispenser 100.

In a T40 station where the precooling temperature of the precooler 210 is set to −40° C., when the precooling temperature reached the target value but the outside temperature is higher than a preset value and the increasing rate of the temperature of the storage tank 310 side is larger than expected, a control signal or current state information may be transmitted to the vehicle 300 or the storage tank 310 so that the self-cooling system of the storage tank 310 may be operated.

Contrarily, when the precooling temperature of the precooler 210 is set to −40° C. but it is determined that the precooling is excessive taking into account the external environment and the actual data, the target value for the precooling temperature may be adjusted (to −35° C., for example).

When the precooling target temperature and the temperature of the storage tank 310 are required to be controlled additionally, the control information or the control commands may be transmitted from the dispenser 100 to both the vehicle 300 and the hydrogen fueling station 200.

According to an exemplary embodiment of the present disclosure, the self-cooling systems of the vehicle 300 and the hydrogen fueling station 200 may be controlled independently or may be controlled in response to a signal from the dispenser 100.

Figure 15:
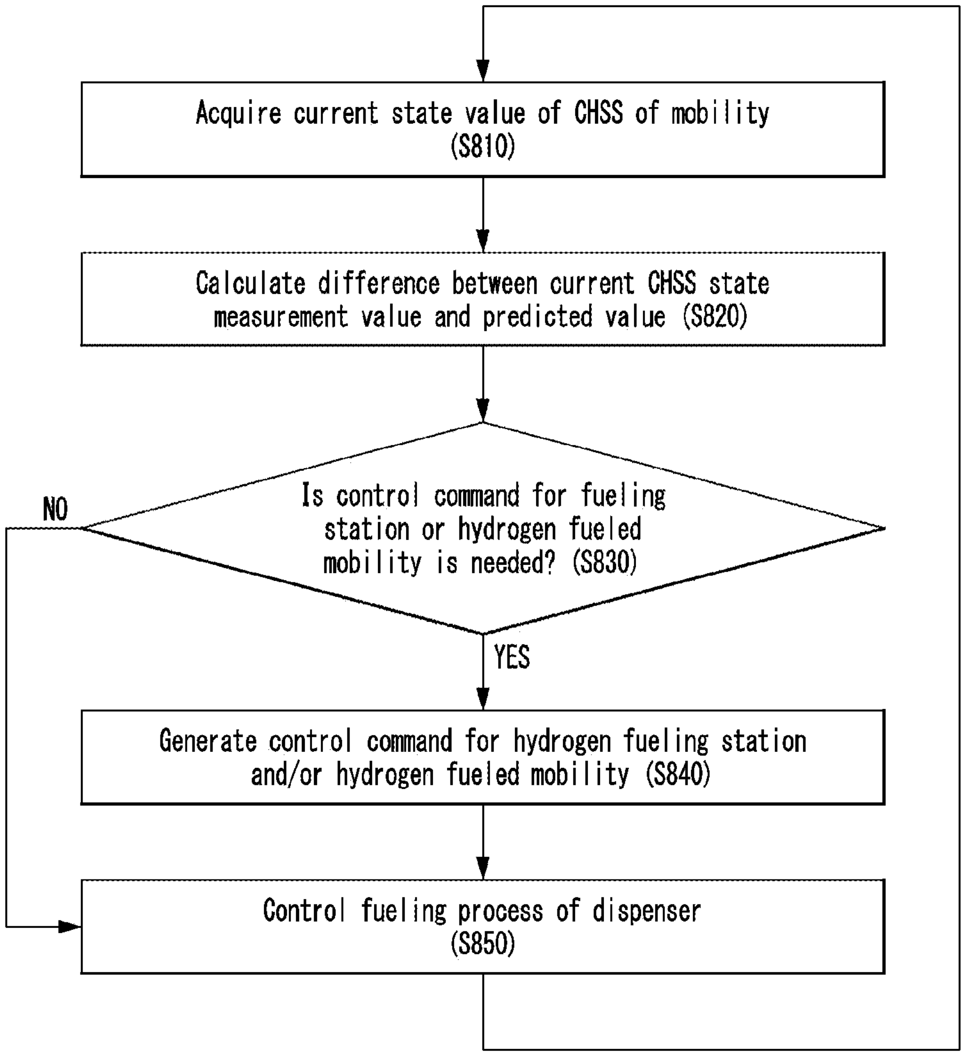
FIG. 15 is a flowchart illustrating an integrated control method for the hydrogen fueling according to an exemplary embodiment of the present disclosure.

FIG. 15 is a flowchart illustrating an integrated control method for the hydrogen fueling according to an exemplary embodiment of the present disclosure.

The hydrogen fueling control method for the hydrogen fueled mobility according to the present embodiment is an integrated control method for the hydrogen fueling and may include operations of acquiring a current state measurement value (S810); determining, based on the current state measurement value, whether a second control command for at least one of the hydrogen fueling station and/or the hydrogen electric vehicle/mobility is needed in addition to a first control command executed in the dispenser (S830); and generating the second control command for at least one of the hydrogen fueling station and/or the hydrogen electric vehicle/mobility according to a determination result (S840).

The second control command for the hydrogen fueling station may include a command for adjusting the target value of the precooling temperature of the hydrogen fueling station.

The second control command for the hydrogen electric vehicle may include a command for cooling the compressed hydrogen storage system (CHSS) of the hydrogen electric vehicle.

The integrated control method for the hydrogen fueling according to an exemplary embodiment may further include an operation of determining whether the current state measurement value satisfies the constraints.

The constraints may include a condition that the temperature and the pressure of the compressed hydrogen storage system (CHSS) 310 in the hydrogen electric vehicle do not exceed the temperature limit and the pressure limit, respectively.

The integrated control method for the hydrogen fueling according to an exemplary embodiment may further include an operation of generating the first control command to be executed on the dispenser side based on the current state measurement value (S850).

The operation S830 may be performed based on the execution result of the operation S820 of calculating a difference between the current state measurement value and the prediction value of the CHSS 310.

Figure 16:
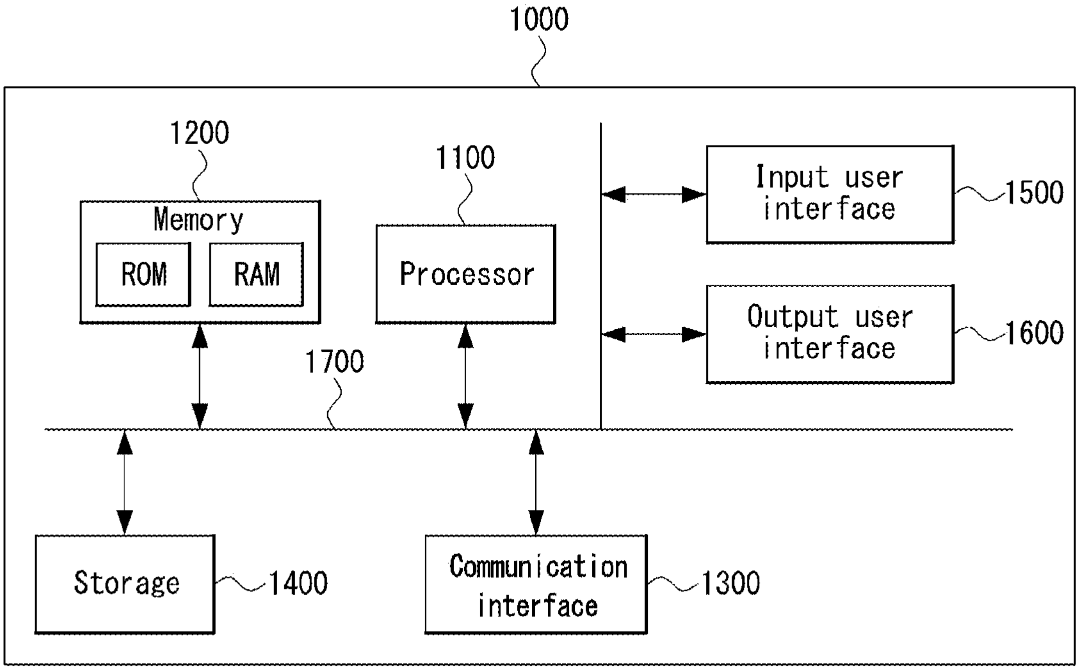
FIG. 16 is a block diagram showing a generalized configuration of a hydrogen fueling control apparatus, a hydrogen fueling control system, or a computing system capable of performing at least a portion of the processes of FIGS. 1-15.

FIG. 16 is a block diagram showing a generalized configuration of a hydrogen fueling control apparatus, a hydrogen fueling control system, or a computing system capable of performing at least a portion of the processes of FIGS. 1-15.

The hydrogen fueling control apparatus may be disposed on the dispenser 100 side. The hydrogen fueling control system may be distributed in the dispenser 100, the hydrogen fueling station 200, and the hydrogen electric vehicle 300 to control at least some of the dispenser 100, the hydrogen fueling station 200, and the hydrogen electric vehicle 300. Alternatively, the hydrogen fueling control system may be disposed in at least some of the dispenser 100, the hydrogen fueling station 200, and the hydrogen electric vehicle 300.

The hydrogen fueling control apparatus and/or the hydrogen fueling control system may be implemented in a form of a computing system including a memory 1200 and a processor 1100 electronically connected to the memory 1200.

At least some processes of the model predictive control-based hydrogen fueling control method, the artificial neural network-based hydrogen fueling control method, and the integrated control method for hydrogen fueling according to exemplary embodiments of the present disclosure may be performed by the computing system 1000 of FIG. 16.

Referring to FIG. 16, the computing system 1000 according to an embodiment of the present disclosure may include a processor 1100, a memory 1200, a communication interface 1300, a storage device 1400, an input interface 1500, and an output interface 1600, and a system bus 1700.

The computing system 1000 according to an embodiment of the present disclosure may include at least one processor 1100 and the memory 1200 storing program instructions instructing the at least one processor 1100 to perform at least one process step. At least some of the operations or process steps of the method according to an embodiment of the present disclosure may be performed by the at least one processor 1100 loading and executing the program instructions from the memory 1200.

The processor 1100, which executes the program instructions or commands stored in the memory 1200, may include a central processing unit (CPU) or a graphics processing unit (GPU) or may be implemented by another kind of dedicated processor suitable for performing the method of the present disclosure.

Each of the memory 1200 and the storage device 1400 may include at least one of a volatile storage medium or a non-volatile storage medium. For example, the memory 1200 may be comprised of at least one of a read only memory (ROM) and/or a random access memory (RAM).

Additionally, the computing system 1000 may include the communication interface 1300 that performs communications through a wireless communication network.

Additionally, the computing system 1000 may further include the storage device 1400, the input interface 1500, and the output interface 1600.

The components of the computing system 1000 may be connected to each other by the system bus 1700 to communicate with each other.

The computing system 1000 according to an exemplary embodiment of the present disclosure may be any data processing device capable of communications through a network such as a desktop computer, a laptop computer, a notebook PC, a smartphone, a tablet PC, a mobile phone, a smart watch, smart glasses, an e-book reader, a portable multimedia player (PMP), a portable game console, a navigation device, a digital camera, a digital multimedia broadcasting (DMB) player, a digital audio recorder, a digital audio player, a digital video recorder, a digital video player, and a personal digital assistant (PDA).

The device and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of integratively controlling hydrogen fueling for a hydrogen fueled mobility, the method comprising:

receiving, from at least one sensor arranged in the hydrogen fueled mobility, a current state measurement value of a compressed hydrogen storage system (CHSS) of the hydrogen fueled mobility;

generating, based on the current state measurement value, a first control command for a pressure ramp rate (PRR) for hydrogen fueling executed on a dispenser;

determining a difference between the current state measurement value and a first prediction value based on the current state measurement value;

determining, based on the difference between the current state measurement value and the first prediction value, whether a second control command for adjusting a target value of a precooling temperature of a hydrogen storing tank in a hydrogen fueling station or cooling the CHSS of the hydrogen fueled mobility is needed in addition to the first control command;

generating the second control command upon determining that the second control command is needed; and controlling hydrogen fueling of the dispenser based on at least one of the first control command or the second control command.

2. The method of claim 1, further comprising:

determining whether the current state measurement value satisfies a constraint.

3. The method of claim 2, wherein the constraint includes a condition that a temperature and a pressure of the CHSS of the hydrogen fueled mobility do not exceed a temperature limit and a pressure limit, respectively.

4. A hydrogen fueling control apparatus for integratively controlling hydrogen fueling for a hydrogen fueled mobility, the hydrogen fueling control apparatus comprising:

a processor; and a memory configured to store at least one program instruction, wherein the processor executes the at least one program instruction is configured to:

receive, from at least one sensor arranged in the hydrogen fueled mobility, a current state measurement value of a compressed hydrogen storage system (CHSS) of the hydrogen fueled mobility;

determine, based on the current state measurement value, a first control command for a pressure ramp rate (PRR) for hydrogen fueling executed on a dispenser;

determine a difference between the current state measurement value and a first prediction value based on the current state measurement value;

determine, based on the difference between the current state measurement value and the first prediction value, whether a second control command for adjusting a target value of a precooling temperature of a hydrogen storing tank in a hydrogen fueling station or cooling the CHSS of the hydrogen fueled mobility is needed in addition to the first control command;

generate the second control command upon determining that the second control command is needed; and control hydrogen fueling of the dispenser based on at least one of the first control command or the second control command.

5. The hydrogen fueling control apparatus as claimed in claim 4, wherein the processor is configured to determine whether the current state measurement value satisfies a constraint.

6. The hydrogen fueling control apparatus as claimed in claim 5, wherein the constraint includes a condition that a temperature and a pressure of the CHSS of the hydrogen fueled mobility do not exceed a temperature limit and a pressure limit, respectively.

* * * * *